United States Patent

[11] 3,587,789

| [72] | Inventors | Friedrich Keilholz<br>Ennepetal-Voerde;<br>Erwin Hausmann, Wuppertal-Elberfeld;<br>Erwin Jentsch, Ennepetal-Milspe, Germany |
|---|---|---|
| [21] | Appl. No. | 802,591 |
| [22] | Filed | Feb. 26, 1969 |
| [45] | Patented | June 28, 1971 |
| [73] | Assignee | August Bilstein<br>Ennepetal-Altenvoerde, Germany |
| [32] | Priority | Feb. 28, 1968 |
| [33] | | Germany |
| [31] | | P 16 50 938.9 |

[54] HYDROPNEUMATIC SINGLE-CYLINDER SHOCK ABSORBER
7 Claims, 10 Drawing Figs.

[52] U.S. Cl. .................................................. 188/269,
188/298, 188/317
[51] Int. Cl. .................................................. F16f 9/40
[50] Field of Search ........................................ 188/88.1,
100 (R), 100 (AF)

[56] References Cited
UNITED STATES PATENTS

| 2,822,164 | 2/1958 | Boschi | (188/100R)UX |
| 2,823,915 | 2/1958 | De Carbon | (188/100AF)UX |
| 3,167,309 | 1/1965 | Wossner | (188/100AF)UX |
| 3,287,008 | 11/1966 | Fernandez | 188/100(R)X |

FOREIGN PATENTS

| 1,410,859 | 8/1965 | France | 188/100(R) |

*Primary Examiner*—George E. A. Halvosa
*Attorney*—Karl F. Ross

ABSTRACT: A hydropneumatic single-cylinder shock absorber comprises a working cylinder partially filled with damping liquid and having pressurized gas above the liquid, and a perforated flexible membrane fixedly mounted in the cylinder as a damping element. The membrane adapts its shape to absorb liquid movements and prevent disturbance of the liquid/gas interface and is perforated to permit only one-way passage of the gas therethrough.

PATENTED JUN 28 1971 3,587,789

Inventors:
Friedrich Keilholz
Erwin Hausmann
Erwin Jentsch

Karl F. Ross
Attorney

HYDROPNEUMATIC SINGLE-CYLINDER SHOCK ABSORBER

This invention relates to hydropneumatic single-cylinder shock absorbers, particularly for wheeled vehicles, which comprise a working cylinder partially filled with damping liquid and having pressurized gas above the liquid, a working piston displaceably mounted in the working cylinder so as to be immersed in the damping liquid and having throttling parts therein for said liquid, a piston rod secured to said working piston, and a calming element for the damping liquid located between the working piston and the pressurized gas and below the level of the liquid.

The calming element has been intended to meet the problem of keeping the movements of the liquid which occur in the damping operation as much as possible away from the boundary surface between the liquid and the pressurized gas above it, and also to act as a stabilizing influence on the damping liquid, in order to avoid the formation of froth which would otherwise occur and quickly spread through the liquid, thereby adversely affecting the damping action of the working piston.

For this purpose, many forms of calming element have been proposed for use in hydropneumatic shock absorbers of the aforesaid generic type. For example, a rigid and fixedly mounted partitions have been used, with the partitions provided with orifices which in some cases can be covered or controlled by valves. However, a sufficient stabilization of liquid cannot be achieved in this way because liquid turbulence always occurs at the orifices in the rigid partition and this turbulence extends up to the boundary surface of the cushion of pressurized gas and causes foaming, especially as the whole volume of liquid displaced by the actuating piston each time it moves inwardly has to pass through the orifices in the rigid partition. It is also known to mount such partitions or baffle plates for limited axial displacement in the working cylinder so that the amount of liquid flowing through the orifices in the movable baffle plates can be correspondingly reduced. Nevertheless, even with this arrangement, foam-creating liquid turbulence still cannot be avoided with certainty, especially as the mounting of such plates for sliding displacement in the working cylinder not only creates an additional expenditure, but also occasionally leads to misalignment of a plate which may therefore stick in the working cylinder and consequently cause even greater liquid turbulence. Furthermore, the weight of the separating plate causes relatively large pressure differentials to arise between the upper and lower sides of the plate in order to move the plate with the rapidity necessitated by the volume of liquid displaced. However, this pressure differential leads to a heavy flow through the passages in the separating plate; since these passage for the aforesaid reasons, must have a very large cross section, the liquid currents produced by the working piston can pass through these openings and reach the upper boundary surface of the liquid.

Furthermore, in certain hydropneumatic single-cylinder shock absorbers, it is known to provide divider elements which form a seal between the damping liquid and the cushion of pressurized gas bearing thereon, for example in the form of a separating piston sealingly guided in the working cylinder or in the form of an impermeable separating membrane. In this way, the formation of froth or foam at the boundary between the damping liquid and the pressurized gas can be prevented in practice. However, the construction of such sealing partitions necessitates not inconsiderable manufacturing costs. Furthermore, there is the disadvantage that gas dissolved in the liquid can come out of solution during the working cycle and accumulate beneath the sealing partition and this can again lead to froth formation. This danger is present in particular with separating membranes which as a rule are not completely impermeable to gas, so that after a sufficiently long working time, there can be a considerable accumulation of gas diffused through the separating membrane.

It is an object of the present invention to provide a hydropneumatic single-cylinder shock absorber, particularly suitable for wheeled vehicles, which does not have these drawbacks and which, furthermore, is provided with a damping element such that on the one hand the liquid turbulence which occurs during the shock-absorbing operation is effectively kept away from the boundary surface between the damping liquid and the cushion of pressurized gas and that, on the other hand, the accumulation of pockets of gas at the underside of the element adjacent to the working piston is completely prevented.

In a hydropneumatic single-cylinder shock absorber of the generic type first mentioned, this is achieved in accordance with the invention in that the calming element comprises a perforated flexible membrane fixedly mounted in the working cylinder.

The membrane is preferably secured at its periphery to the internal wall surface of the working cylinder and is perforated in its central region. The membrane, which may be elastic, is preferably sufficiently flexible to adapt itself completely to the volume of liquid displaced by each outward and inward motion of the piston rod, i.e. its perforated central portion floats in that liquid so as to deflect upwardly and downwardly movements without buildup of any appreciable pressure differential between the two sides of the membrane, with the result that substantially no liquid passes through the perforated membrane. The liquid movements or currents occurring during the working cycle are thereby contained and absorbed as it were by the membrane, i.e. a stabilization of the damping liquid is achieved over the whole cross section of the working cylinder, so that the liquid/pressurized-gas boundary surface only executes a regular upward and downward motion between to limiting portions corresponding to the volume of liquid displaced by the piston, which reduces the formation of froth at the boundary surface, If, however, boundary-surface froth should form, it cannot pass downwardly through the flexible separating membrane in the direction of the working chamber containing the working piston. Moreover, it is of great importance that the small perforations in the membrance only permit the passage of liquid displaced from the working chamber by the heating of the damping liquid which occurs during the shock-absorbing process, with the result that the membrane can continually work in its normal mounted position independently of the temperature of the damping liquid. The membrane is therefore subjected to correspondingly less stress from the damping liquid. A third important advantage of the invention is that, in every instance, the perforations present in the flexible membrane prevent the accumulation of pockets of gas beneath the membrane and thus ensure that no foam can form in the working chamber containing the working piston. Since the perforations in the membrane can be kept very small and since the membrane itself takes part in the movements due to the stroke of the piston rod, a smaller amount of liquid above the membrane is sufficient to guarantee satisfactory operation of the shock absorber in an inclined position. The surface tension of the damping liquid which prevails at the small orifices is so great as to prevent the pressurized gas from passing out of the gas chamber into the working chamber. Such a hydropneumatic shock absorber can even be stored in an inverted position, i.e. with the cushion of pressurized gas located at the bottom, without the pressurized gas passing upwardly through the perforations in the membrane. However, even if some gas should pass through the perforations, there is no problem since the gas which in this way reaches the working chamber escapes again back through the membrane upwardly into the gas chamber when the shock absorber is mounted on a vehicle, or at any rate as soon as the shock absorber begins to function.

In order that the invention may be fully understood, a number of embodiments of the damper in accordance with the invention will now be described by way of example and with reference to the accompanying drawing, in which.

Figure 1:
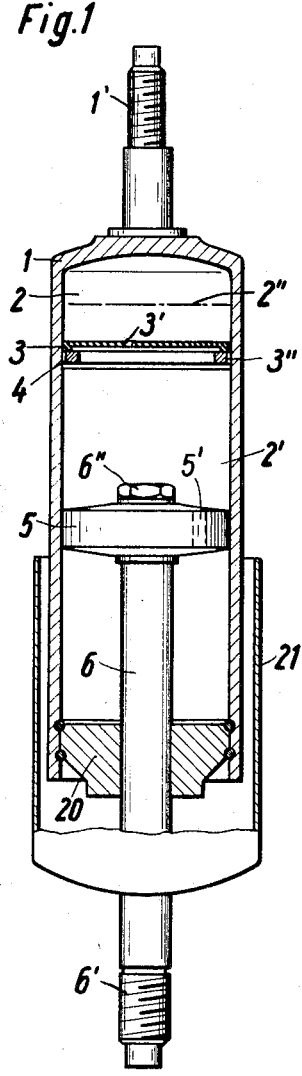
FIG. 1 is an axial section through a hydropneumatic single-cylinder shock absorber in accordance with the present invention.

The hydropneumatic single-cylinder shock absorber illustrated in FIG. 1 is of conventional construction insofar as it includes a working cylinder 1 which is partially filled with a gas 2 under pressure and with damping liquid 2', such as oil, and a working piston 5 slidably fitted in the working cylinder 1 so as to be immersed in the damping liquid 2'. The working piston 5 is provided with throttling passages as shown at 5', preferably valve-controlled, for the damping liquid and is secured to the inner end of a piston rod 6 which extends outwardly through a cylinder base plate 20 which seals the lower end of the cylinder. The piston rod surrounded by a protective casing 21 is also provided at its lower end with a screw pin 6' by means of which it can be connected to the wheel axle of a vehicle. The working cylinder 1 is a suitably secured to the vehicle chassis by means of a pin connection 1' provided at its upper end. The boundary surface between the cushion of pressurized gas 2 and the damping liquid 2' is denoted in the drawing by 2".

In accordance with the invention, a flexible membrane 3 acting as a calming element is positioned just below the liquid level 2 and is provided with a small hole or orifice 3' in its central region. The periphery 3" of the membrane 3 is secured to the inside wall of the working cylinder 1 by means of a circular clip 4. The membrane 3 which is preferably made of a sufficiently pliable, thin synthetic-resin material has a flexibility which enables it to follow the reciprocations of the damping liquid produced by the inward and outward movements of the piston rod 6, and thus to deflect or curve upwardly or downwardly sufficiently to prevent any noticeable amount of liquid from passing through the small hole 3'. The hole 3' is only effective, i.e. traversed by damping liquid (and that to a small extend) when the temperature increases in the damping liquid 2' during the shock-absorbing process and causes the liquid to expand. Thus it is ensured that the flexible membrane 3 remains continuously in its normal installation position and simply flexes up and down about its center position in accordance with the quick inward and outward movements of the piston rod 6 and of the liquid displaced thereby. The stress on the membrane 3 is thereby minimized. Furthermore, the small hold 3' in the membrane 3 ensures that any pockets of gas which collect beneath the membrane during the shock-absorbing process can escape upwardly through the hole 3' into the pressurized-gas chamber located above the membrane, so that the working chamber situated beneath the membrane 3 remains free of gas and the working piston 5 operates continually in the dense damping liquid 2'. The currents of liquid which appear above the working piston 5 during each descent of the piston rod 6, as the liquid passes upwardly through the throttling passages in the piston, are intercepted by the membrane 3 so that they do not reach the boundary surface 2", and therefore no corresponding emulsifying effect is produced. Any foam which nevertheless forms at the boundary surface 2" is prevented with certainty from entering the working chamber containing the working piston 5 by the flexible membrane 3 mounted below the boundary surface. Since the hole 3' in the membrane is only intended for the very small limited flow of liquid which is produced by the heating of the shock absorber and can therefore be very small in cross section the shock absorber can even be mounted in an inclined position on account of the surface tension of the damping liquid 2' at the hole 3'. It has been shown in practice that it is even possible to mount the shock absorber in an upturned position, i.e. with the piston rod 6 emerging at the top, without the pressurized gas now beneath the membrane 3 passing through the orifice 3'. Even if this should happen, for example, because of external vibration of the shock absorber, it is irrelevant so far as the subsequent use of the device is concerned because the pressurized gas which has infiltrated into the working chamber passes back again through the hole 3' in the membrane 3 into the gas chamber 2 above the membrane when the shock absorber is returned to its normal position as shown in FIG. 1. Upon a particularly long upward stroke of the piston rod 6, the flexible membrane 3 is engaged by a nut 6" on the inner end of the piston rod and owing to the nature of the membrane the latter is able to give a little without a disturbing noise as would otherwise if the damping element rigid. It is also possible with only nominal constructional expenditure to fit a buffer pad in the compensating chamber which contains the cushion of pressurized gas 2.

Figure 2:
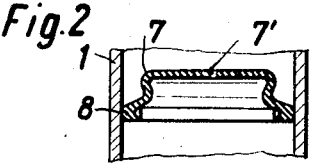
FIGS. 2 to 5 show various alternative embodiments of the stabilizing or calming element used therein.
Figure 3:
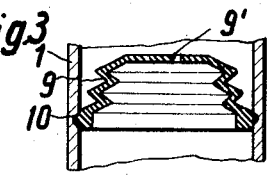
Figure 4:
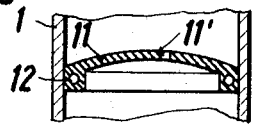
Figure 5:
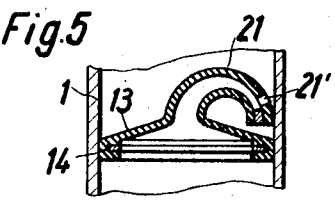

The membrane 3, instead of being stretched flat as shown in FIG. 1, can have different constructions and shapes. Thus, FIG. 2 shows an essentially cap-shaped flexible membrane 7 having a small central hole 7', the periphery of the membrane 7 being firmly pressed against the inside wall of the working cylinder 1 by a clamping ring 8. In the embodiment of FIG. 3, the membrane 9 which is provided with a hole 9' is formed as a bellows and has a membrane bead 10 which is fitted in a correspondingly shaped groove in the wall of the working cylinder 1. In the embodiment of FIG. 4, the membrane 11 provided with a hole 11' has a spring ring 12 inserted in its peripheral portion, the ring 12 ensuring a sufficiently secure mounting of the membrane in the working cylinder 1. In the embodiment illustrated in FIG. 5, the flexible membrane 13 mounted in the working cylinder 1 by means of a resilient tension ring 14 is provided on the side facing the pressurized gas chamber 2 with a nonrigid tubular extension 21 which has a small hole 21' at its overhanging end.

Figure 6:
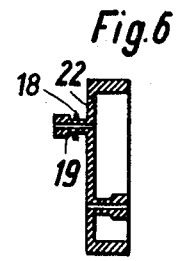
FIGS. 6 and 6A are top and side sectional views of a membrane according to the present invention.
Figure 6A:
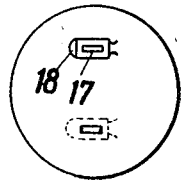

In the embodiment illustrated both in plan view and in cross section in FIGS. 6 and 6a the flexible membrane 22 is provided with two one-way valves 17 which are located on opposite sides of the membrane so as to open in opposite directions. The outlet ports 19 thereof are restricted by a hairpin spring 18 or the like, so that they open only in one direction. Thus, liquid subject to thermal expansion in the working chamber as well as any accumulated gas can pass into the compensating chamber containing the cushion of pressurized gas 2, whilst in the reverse sense, the damping liquid can be drawn back from the compensating chamber into the working chamber containing the working piston 5. In the rest state of the shock absorber, both valves 17 are closed so that the device can be stored and transported in any attitude. For the same purpose, the hole in the flexible membrane illustrated in all the embodiments described above may be covered by a suitably shaped valve flap or plate.

Figure 7:
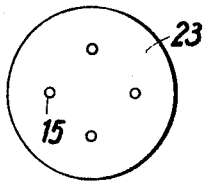
FIGS. 7 and 8 are top views, similar to FIG. 6, showing alternative embodiments of the membrane.
Figure 8:
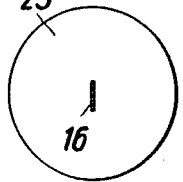

In the embodiment shown in FIG. 7, the flexible membrane 23 is perforated by four equispaced spaced holes 15 therethrough, while in the embodiment according to FIG. 8 the hole takes the form of a narrow slit 16.

Figure 9:
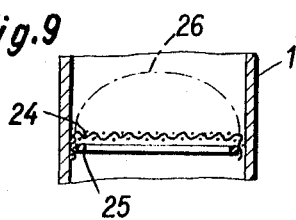
FIG. 9 is a top view, similar to FIGS. 2—5, showing a further embodiment of this invention.

Other designs are also possible for the flexible membrane provided with one or more small holes. For example as shown in FIG. 9, the membrane 24 may consist of a suitably fine-gauge mesh held by a ring 25. However, the membrane should always be sufficiently flexible to be able to follow the comparatively rapid liquid movements caused by the piston rod moving inwardly and outwardly as shown by dot-dash lines 26, so that the damping liquid does not pass through the hole or holes to any noticeable extent. The holes are provided only for the flow of liquid displaced by thermal expansion and for the elimination of any possible gas pockets. Consequently, the flexible membrane may be made completely from a material which has a relatively high permeability to gas.

We claim:

1. A hydropneumatic single-cylinder shock absorber comprising a working cylinder partially filled with damping liquid and having pressurized gas above the liquid; a working piston displaceably mounted in the working cylinder so as to be immersed in the damping liquid and having throttling ports therein for said liquid; a piston rod secured to said working piston; and a calming element for the damping liquid located between the working piston and the pressurized gas and below the level of the liquid, said calming element comprising a flexible membrane having a rim fixedly mounted in the working cylinder and having a floating central portion axially movable between two limiting positions to follow movement of said piston in said working cylinder, without generation of a substantial pressure differential thereacross, said central portion having at least one orifice so dimensioned that said damping liquid is substantially completely prevented from flowing therethrough between said limiting positions.

2. A shock absorber as defined in claim 1 wherein said central portion is a bellows.

3. A shock absorber as defined in claim 1 wherein said central portion has a flexible tubular extension terminating in said orifice.

4. A shock absorber as defined in claim 1 wherein said orifice has the shape of a slit.

5. A shock absorber as defined in claim 1 wherein said central portion has at least two orifices each provided with a one-way valve, said valves giving passage in opposite directions through said membrane.

6. A shock absorber as defined in claim 1 wherein the membrane consists of a fine-gauge mesh.

7. A shock absorber as defined in claim 1 wherein said membrane consists of a thin pliable plastic foil.